United States Patent [19]

Shelley et al.

[11] Patent Number: 5,101,269
[45] Date of Patent: Mar. 31, 1992

[54] STEREOSCOPIC ELECTRONIC SLIDE AND PRINT VIEWER

[75] Inventors: Paul R. Shelley; Kenneth A. Parulski, both of Rochester, N.Y.

[73] Assignee: Eastman Kodak Company, Rochester, N.Y.

[21] Appl. No.: 584,970

[22] Filed: Sep. 18, 1990

[51] Int. Cl.$^5$ .................... H04N 13/00; H04N 15/00
[52] U.S. Cl. .......................... 358/88; 358/3; 353/7; 359/466; 359/462; 359/477
[58] Field of Search ...................... 358/88, 93, 102, 3; 353/6, 7, 9; 350/130-143, 515

[56] References Cited

U.S. PATENT DOCUMENTS

| | | | |
|---|---|---|---|
| 3,784,738 | 1/1974 | Natter | 358/88 |
| 3,959,580 | 5/1976 | Chocol et al. | 350/131 |
| 4,078,850 | 3/1978 | Chaban | 350/138 |
| 4,726,653 | 2/1988 | Thaler et al. | 350/133 |
| 4,751,570 | 6/1988 | Robinson | 358/88 |
| 4,851,901 | 7/1989 | Iwasaki | 388/88 |
| 4,943,853 | 7/1990 | Morisawa | 358/102 |
| 4,962,422 | 10/1990 | Ohtomoto et al. | 358/88 |

Primary Examiner—James J. Groody
Assistant Examiner—Michael H. Lee
Attorney, Agent, or Firm—Edward Dugas

[57] ABSTRACT

A stereoscopic electronic viewer for a stereo image pair provided in a fixed medium includes a light source which passes light rays through the fixed images of the stereo image pair. The rays project onto a mirror which redirects the rays through a lens unit. The light rays from each image are associated with a particular lens in the lens unit which focuses the image onto an associated CCD image sensor. The two CCD image sensors have separate but synchronized electronics and provide a synchronized output which is fed to a stereo viewing device such as stereo goggles or a time-multiplexed polarized display. The electronic viewer is mechanically designed to manipulate the image produced on the display device to allow for panning and zooming of the stereoscopic image while maintaining the full resolution provided by the image sensor.

11 Claims, 10 Drawing Sheets

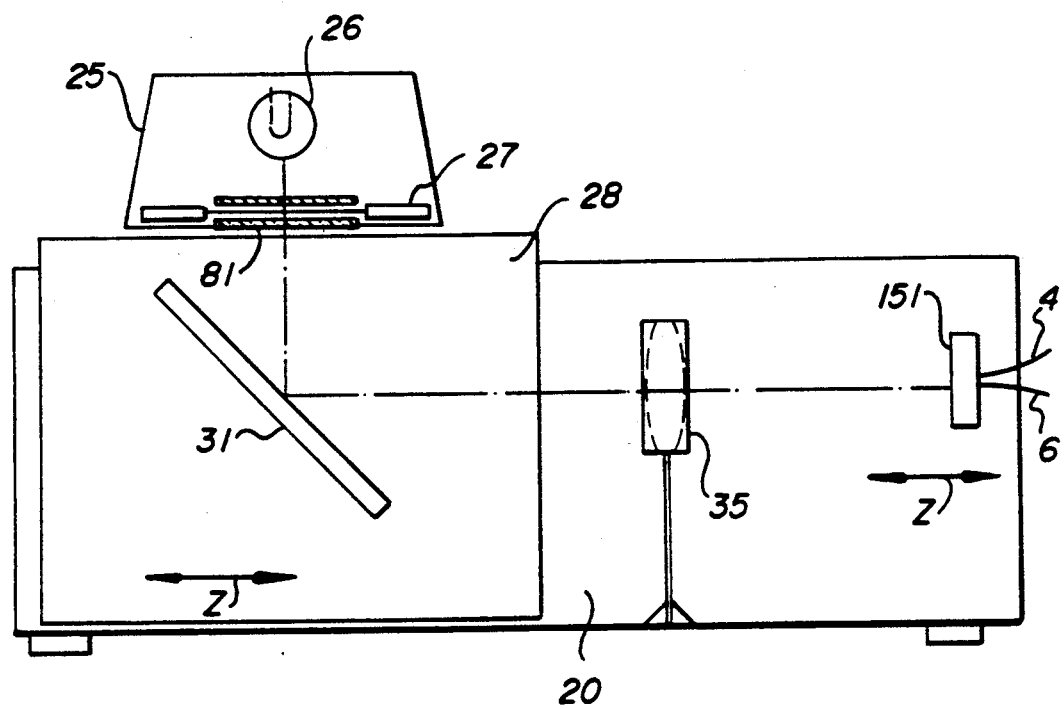
FIG. 2
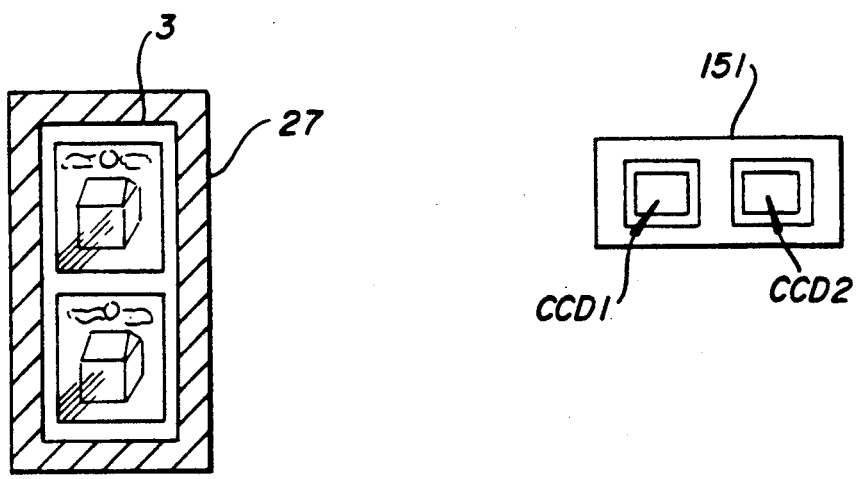
FIG. 2B
FIG. 2A

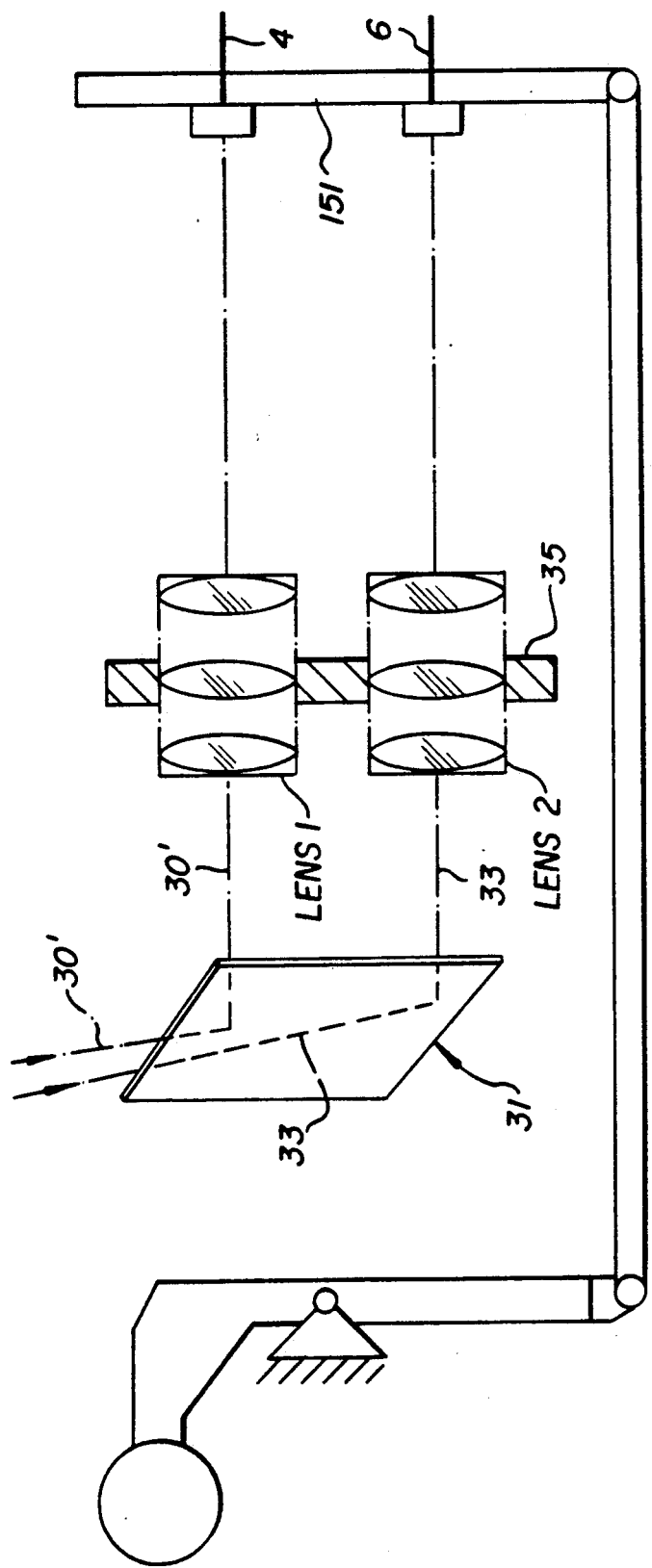

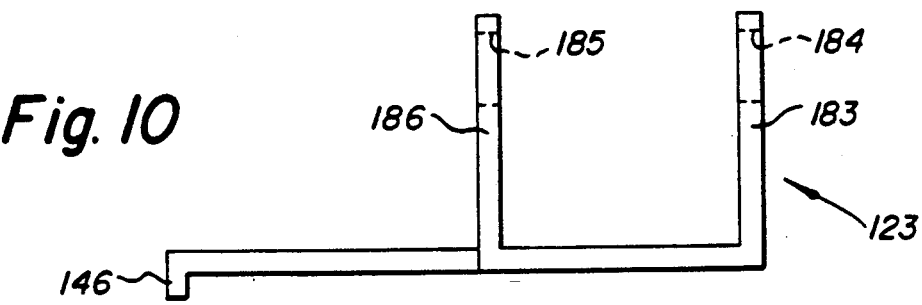
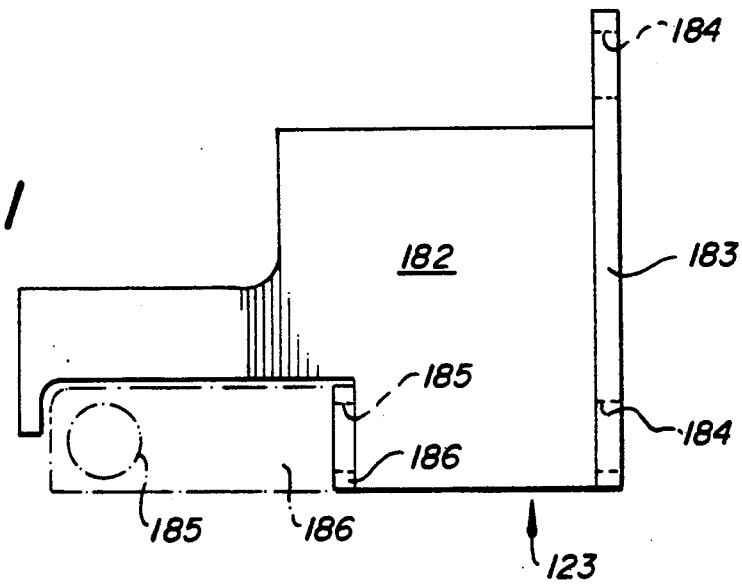
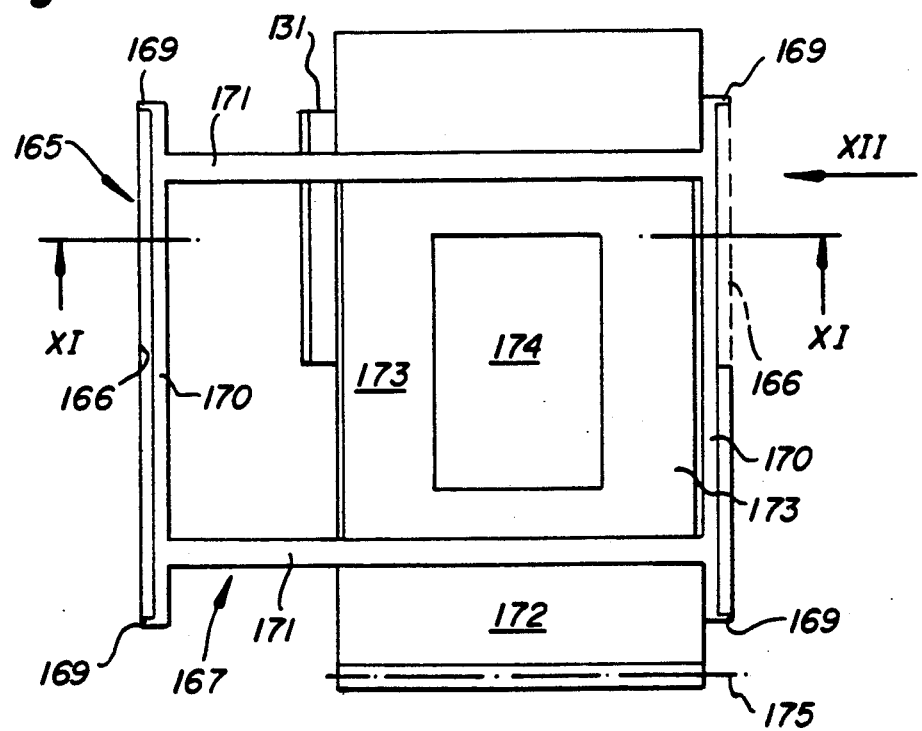

STEREOSCOPIC ELECTRONIC SLIDE AND PRINT VIEWER

FIELD OF THE INVENTION

The invention relates to the viewing of fixed stereo image pairs, such as stereoscopic slides or prints and, more particularly, to a device allowing zooming and panning of the fixed stereo image pair.

BACKGROUND OF THE INVENTION

Presently, there are several devices available to view a fixed stereo image pair. One well-known device is the "Viewmaster" children's toy, which has a binocular-type front viewing port. The device operates by viewing stereo slides which are mounted on a cardboard circle having an approximate diameter of 68 mm. The two slides are mounted on opposite ends of the cardboard circle. Optics are used to present the proper images of the stereo slide pair to the left and right eye of the viewer. This allows the left eye and right eye slides, i.e., the fixed stereo image pair, to achieve a 3-dimensional (3-D) effect.

Another known type of 3-D viewer allows for the viewing of stereo print images. The stereo prints are placed beneath a binocular viewing tripod, which is located approximately 8-10 inches above the print image plane. By looking through the viewer, the operator sees a 3-D effect. This viewing technique is widely used for military 3-D reconnaissance photography and intelligence gathering.

A flying spot scanner for converting stereo slides to video signals is described in the article "New Aspects and Experiences in Stereoscopic Television" SMPTE Journal, November 1984. This 3-D slide scanner scans the stereo slide using a light beam from a flying spot tube which is focused by dual lenses onto the two images of the stereo slide. The device, however, does not allow for the panning and zooming of the fixed medium stereo image pair.

A system for converting standard 2-dimensional images into television signals uses an electronic image converter developed by Kodak AG Research Labs, Stuttgart, Germany, a U.S. application having been filed on July 6, 1990 and has PCT. No. PCT/EP90/01907.

In this system, a fixed image is illuminated by a light ray from a movable light source. The light beam is reflected by a 45 degree mirror and focused by a lens onto a charge coupled device (CCD) image sensor. The CCD sensor output is processed to allow display on a conventional television display. The system includes a sled and cam structure which allows the image to be zoomed and panned while remaining in focus. However, the system operates only for standard 2-dimensional images.

Therefore, there is a need for a 3-D system which allows for the manipulation, i.e. zooming and panning, of a fixed stereo image pair which maintains the resolution of the image.

SUMMARY OF THE INVENTION

The present invention provides a system to electronically view stereo image pairs and allow for the zooming and panning of the 3-D image produced. The stereo image pair is viewed electronically via an imaging converter which is coupled to stereo viewing goggles worn by the user to perceive the 3-D effect. For the viewing of stereo slides, a light source large enough to accommodate the slides provides backlighting for the slides. Light rays pass through the slides and project onto a mirror which redirects the rays for each slide image through a lens unit. The lens unit includes two lenses, one associated with each of the images, and focuses the rays from each image in the stereo image pair onto an associated CCD sensor. Thus, one sensor receives the light rays from the first (right eye) slide in the pair and the other sensor receives the rays from the second (left eye) slide.

The two CCD sensors have separate but synchronized electronics, and are combined into an integrated package within the device. The synchronized output from the sensors' electronics is fed to a stereo viewing device such as stereo goggles which are worn by the user. This allows the stereo slides to be viewed in 3 dimensions.

The sled and cam incorporated in the device allows the 3-D effect to be zoomed or panned. The effect perceived using the stereo viewing device will thus track the movement of the slides, allowing the user to virtually zoom in and "look" at different depth planes within the image.

For viewing stereo prints, the device is modified accordingly such that electronic cameras and fixed focus lenses are set up on a "copy stand" to view the stereo prints. In this instance, the print bed is moved in its X-Y axis to pan the image. Zooming can be achieved using a similar cam design as that for the stereo slides.

An advantage of the present invention is that it provides the ability to view the slides and prints in 3-D space while enlarging, i.e. zooming, and panning of images without any associated loss of resolution as would occur if the image were zoomed and panned electronically.

A further advantage is that the 3-D viewer can be used to scale objects within a given scene based on the zoom factor and the selectable panning or "cropping" of any object. This has particular benefits for military and governmental applications wherein a building or airfield can be scaled and cropped to provide accurate dimensions or measurements.

In alternate embodiments, the stereo viewing device, such as the stereo goggles, can be replaced with liquid-crystal shutters and a single time-multiplexed screen. Similarly, polarized glasses and a time-multiplexed shutter screen could also be used to view the 3-D image.

Other objects, advantages and novel features of the present invention will become apparent from the following detailed description of the invention when considered in conjunction with the accompanying drawings.

BRIEF DESCRIPTION OF THE DRAWINGS

FIG. 2 is a simplified side perspective of the stereoscopic viewer system;

FIG. 2A is a top view illustrating an example of a stereo image medium usable in the present invention;

FIG. 2B is a front view of the imager bracket of the present invention;

FIG. 3 is a top perspective of the system of FIG. 2 without the light source unit;

FIG. 10 is a lateral view seen in the direction of arrow VIII in FIG. 7;

FIG. 11 is a plan view of the sensor carriage;

FIG. 12 is a plan view of the two carriages for the holder;

DETAILED DESCRIPTION OF THE DRAWINGS

Figure 1:
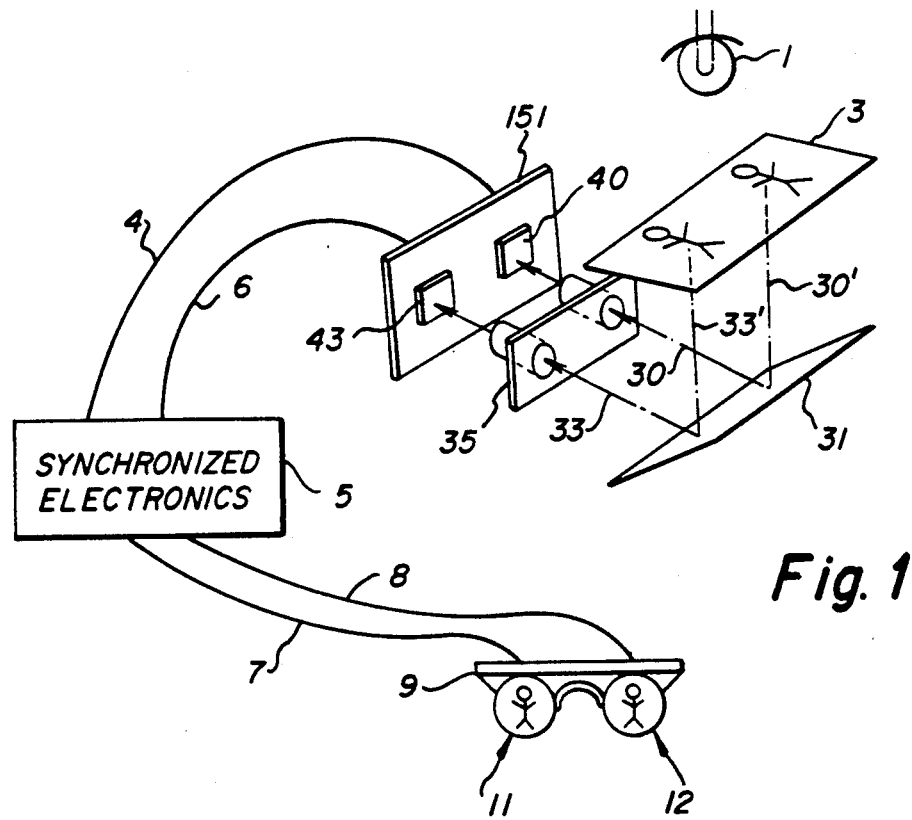
FIG. 1 is a simplified schematic block diagram illustrating the stereoscopic electronic view system of the present invention.

Referring to FIG. 1, the components of a stereoscopic electronic viewer system are shown without their mechanical couplings. A fixed stereo image pair 3, for o example, stereoscopic slides, pass light: rays 30', 33' generated from a light source 1 to a mirror 31. The mirror 31 redirects the light rays 30' and 33' to each pass through a respective lens located in the lens bracket 35. The redirected light rays 30 and 33 are then focused by their respective lenses onto their associated charged coupled device (CCD) sensors 40 and 43 held in an imager bracket 151. Each of the CCD sensors generate video signals corresponding to their respective image in the image pair 3, as an output over signal lines 4 and 6 to the synchronized electronics block 5.

Figure 1A:
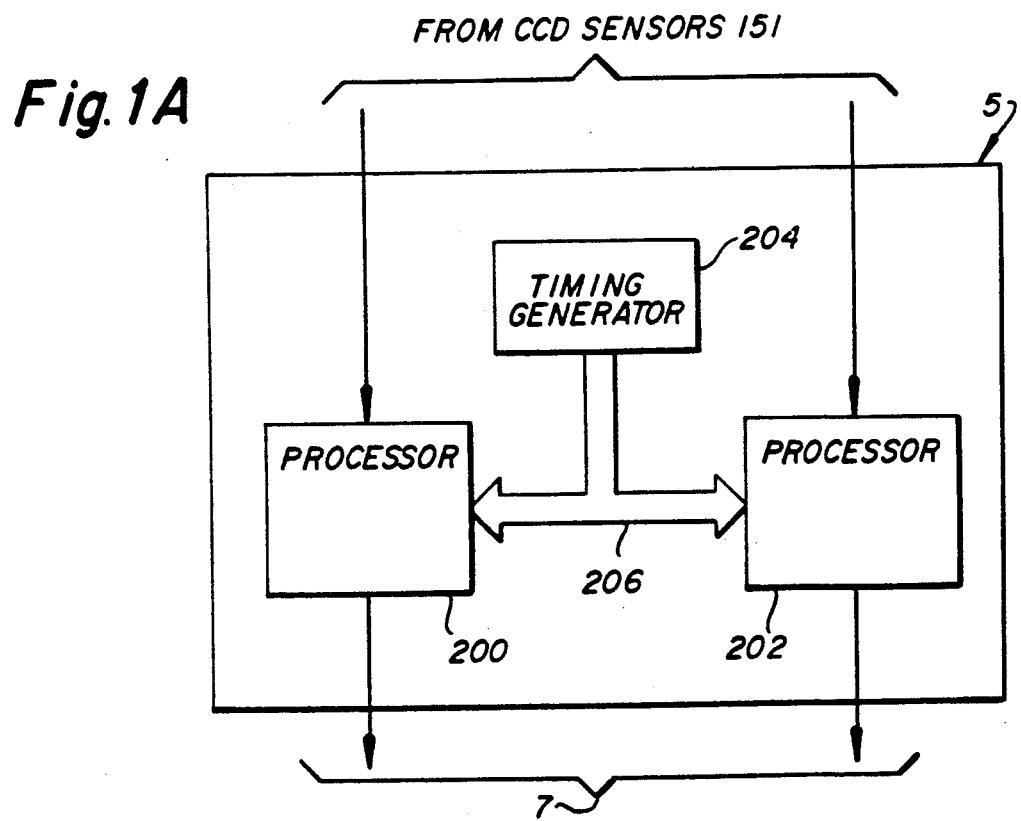
FIG. 1A is a block diagram of the synchronized electronics in FIG. 1.

The synchronized electronics 5 are commercially available components and can include two television camera processors 200 and 202 and an NTSC timing generator 204 coupled over a parallel bus 206 to the processors as shown in FIG. 1A. The synchronized electronics block 5 provides a multiplexed signal over signal lines 7 and 8 to the stereo viewing device, such as the stereo viewing goggles 9, incorporating miniature TV viewfinder displays 11 and 12 to produce a viewable 3-D image.

FIG. 2 is a simplified side perspective of a stereoscopic view system which allows panning and zooming of a 3-D image produced according to FIG. 1. A light source unit 25 includes a lamp 26 which illuminates a fixed stereo image pair held in place by a holder 27. A glass plate 81 holds the stereo image pair in a plane position in the holder 27. The light source unit 25 is coupled with a housing 20 which includes mirror 31, lens bracket 35 and imager bracket 151. The mirror 31 serves to redirect the light rays from the lamp 26 which pass through the stereo image pair.

FIG. 2A shows an example of a stereo image slide pair 3 which can be mounted in holder 27. It is to be understood, however, that any fixed stereo image pair, such as stereo prints, may also be used in the present invention with only minor modifications. The light rays passing through each image in the stereo image pair are redirected by the mirror 31 through respective lenses held by the lens bracket 35. Each lens focuses the light rays upon an individual CCD sensor located in the imager bracket 151.

FIG. 2B shows a front perspective of the imager bracket 151 holding the CCD sensors (CCD 1 and CCD 2). The mirror 31 and imager bracket 151 form part of a zooming carriage 28 which allows for zooming in on the 3-D image produced through the use of the stereo image pair. The carriage direction for zooming movement is indicated in FIG. 2 by the horizontal arrows Z located at the mirror and imager bracket.

FIG. 3 provides a top perspective view of the simplified system shown in FIG. 2. The light rays 30' and 33' which pass through respective images in the stereo image pair (not shown) are reflected by mirror 31 and pass through their respective lens units (Lens 1 and Lens 2) located in the lens bracket 35 which focus the rays on the CCD sensors. The individual lens units may each be formed of compound lenses as shown. The signals generated from the CCD sensors are provided as outputs on their respective lines 4 and 6 to the synchronized electronics (not shown).

Figure 4:
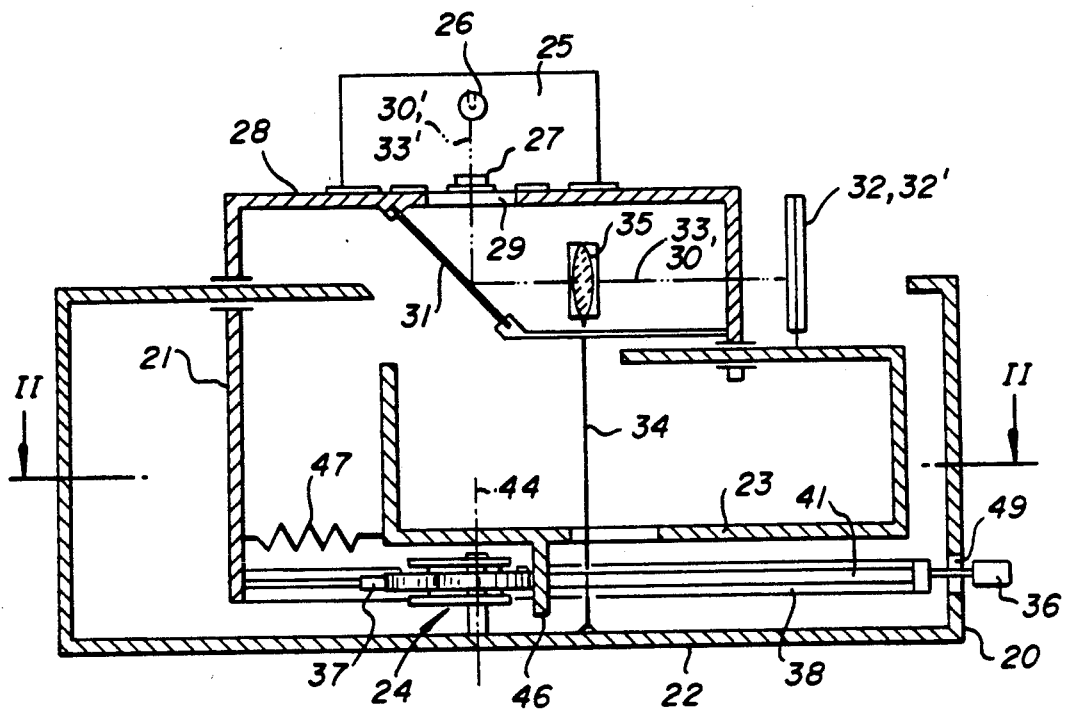
FIG. 4 is a vertical longitudinal cross section along line I—I in FIG. 5 of a theoretical embodiment illustrating the principle of the present invention.
Figure 5:
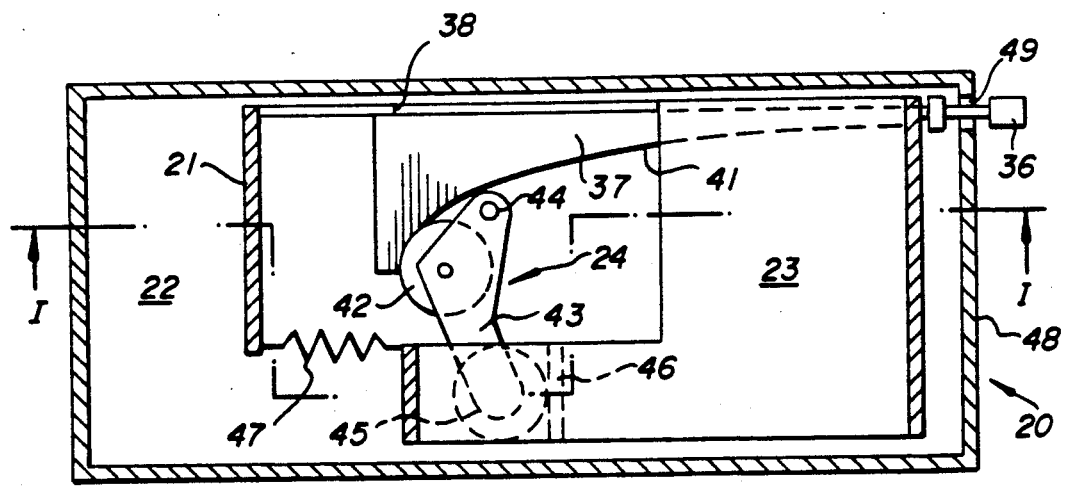
FIG. 5 shows a section along line II—II in FIG. 4.

FIGS. 4 and 5 show a schematic embodiment of the device according to the above-described FIGS. 2 and 3 for converting into video signals the light signals from desired sections of a fixed stereo image pair such as a stereo slide pair. The video signals are then used to form 3-D television images for a viewer. The device includes a housing 20 in which stereo image carriage 21, serving as a stereo image pair carrier, is mounted so as to be movable in the plane of the drawing and parallel with the bottom 22 of the housing 20, i.e. in the longitudinal direction of the housing 20. A lens-or carriage- 23 which is movable in the same direction as the image carriage 21 is connected with the stereo carriage 21 so as to be shiftable relative thereto. A gear mechanism, generally denoted 24, is provided between the two carriages.

A light source unit 25 is movable on the stereo image carriage in two orthogonal directions in a horizontal plane. The light source unit 25 houses the lamp 26 and the image holder 27. The upper wall 28 of the stereo image carriage 21 includes an opening 29 below which the mirror 31 is rigidly fixed in the stereo image carriage 21. The face of the mirror 31 is fixed at an angle of 45° to the vertical. On the sensor carriage 23, two CCD sensors 32 and 32' are arranged such that the light of lamp 26 passes through the stereo image pair arranged in holder 27 and is reflected by mirror 31 to impinge on the sensors' surface. In the path of the light beams from mirror 31 to the sensors' surface, a lens bracket 35 is arranged on a carrier 34. The lens bracket 35 defines two horizontal optical axes 30, 33 (only one of which can be seen in FIG. 4), one corresponding to each image in the pair. The carrier 34 is fixedly connected to housing 20.

The gear mechanism 24 connects the stereo image carriage 21 with the sensor carriage 23. This gear mechanism 24 includes a cam portion 37 which is connected with the stereo image carriage 21 so as to be movable in a dovetail guide 38 thereof, in parallel with the plane of the illustration in FIG. 5. A knurled head screw 36 is provided for displacing the cam portion 37 relative to the stereo image carriage 21 and for focusing thereby the optical system.

The cam portion 37 features a cam 41 which is engaged by the roller follower 42 mounted for rotation on a lever 43. The lever 43 pivots about a journal bearing 44 that is rigidly attached to housing bottom 22. The level 43 also carries at its outermost end a second roller follower 45 also mounted for rotation.

The second follower roller 45 rests against a lower projection 46 of the sensor carriage 23 which is coupled with the stereo image carriage 21 by means of a tension spring 47. The tension spring 47 urges the projection 46 into contact with the second roller follower 45 which in turn urges the cam 41 into contact with the first roller follower 42. In this manner, the gear mechanism 24 determines the position of the stereo image carriage 21 relative to the sensor carriage 23, i.e., when the stereo image carriage 21 is moved horizontally towards the left in the plane of the illustration according to FIG. 4, the roller follower 42 follows cam 41 and pivots lever 43 clockwise such that, under the action of spring 47, the sensor carriage 23 follows the pivotal movement of the lever. As a result of this movement towards the left, as shown in the illustrations of FIGS. 4 and 5, the object distance "g", from an image of the image pair held in holder 27 to the corresponding principal plane of the corresponding lens held in bracket 35, is increased. Simultaneously, the image distance "b" from the two CCD sensor surfaces to the corresponding principal plane of the corresponding lens held in lens bracket 35 is reduced. Cam 41 is designed such that when the focal length "f" of the lens bracket 35 is, for example, equal on either side, Abbe's law of imagery $$1/b + 1/g = 1/f$$

is fulfilled.

As can be seen from FIG. 5, a recess 49 is provided for screw 36 in the right end wall 48 of housing 20. The screw 36 fully projects from the recess 49 when the stereo image carriage 21 is in its right position, as seen in FIGS. 4 and 5, wherein the object distance "g" is at its smallest value. In rightmost, position, the greatest enlargement of the stereo image scene is produced in the plane of the CCD sensors' surface. Further, the images produced by the two CCD sensors 32 and 32' can be sharply focused by rotation of screw 36. Such focusing is necessary in particular because the device is usable for both glass mounted and non-glass mounted stereo slides. The screw 36 serves to compensate for the change in the object distance "g" which results from the thickness of the mounted glass stereo slide pair.

In operation, once the focus has been adjusted to the smallest object distance "$g_m$in", the stereo image carriage 21 is moved to the left to achieve an enlargement or zooming of =1. Subsequently, the light source unit 25 is moved or panned such that the desired section of the stereo image pair is located in the middle of the monitor screen. Next, the stereo image carriage 21 is moved to the right as shown in FIGS. 4 and 5. The object distance "g" is thus reduced until the desired section of the stereo image pair is displayed in its enlarged form.

In the embodiment described in the following with reference to FIGS. 6 to 14, those parts which functionally correspond to the parts illustrated in FIGS. 4 and 5 bear similar reference numerals each increased by 100.

Figure 6:
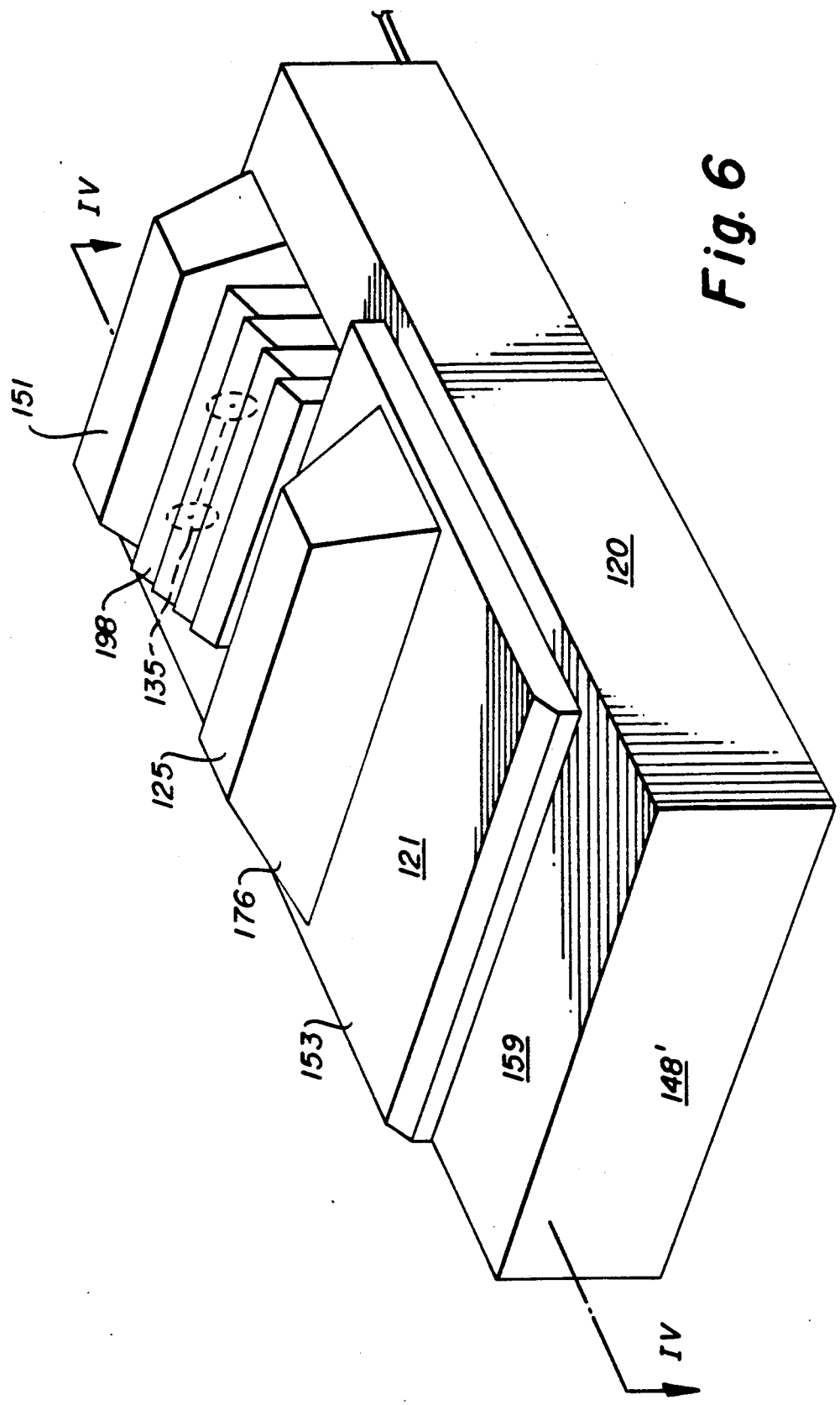
FIG. 6 is a simplified perspective view of an actual embodiment.

FIG. 6 is a perspective view of those parts of the device as are outwardly visible. The device includes housing 120, stereo image carriage 121, and an imager bracket 151 which is positioned on the sensor carriage 123 (not shown in FIG. 6 but visible in FIG. 7) and carries the two CCD sensors (not shown in FIG. 6) and in which the light signals received by the CCD sensors are converted into electronic signals. The device further includes light source unit 125 which is mounted on the stereo image carriage 121 so as to be movable in two orthogonal directions to allow for panning of the stereo image pair. In the space covered by bellows 198, between the mirror 131 (FIG. 4) and the imager bracket 151, the lens bracket 135, containing two identical lenses indicated by dashed lines in FIG. 6, is rigidly attached to the housing 120. The lens bracket 135 defines two optical axis 130 and 133 and their deflections 130' and 133' (FIG. 7).

Figure 7:
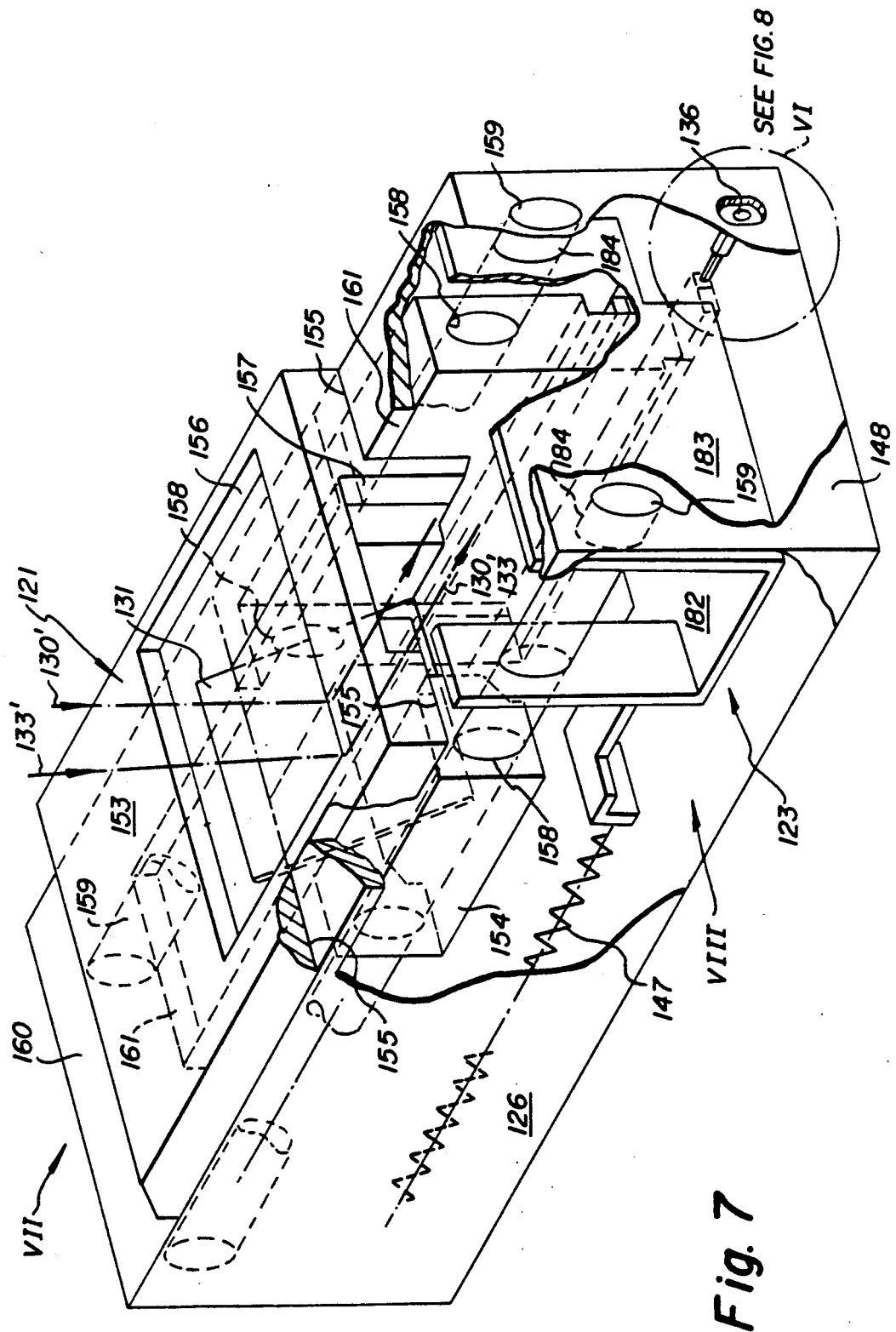
FIG. 7 is a perspective view, partially broken away, of the stereo image carriage and the sensor carriage within the housing.

In this embodiment shown in FIG. 7, the stereo image carriage 121 includes an upper portion 153 and a lower portion 154 which are coupled to form a compact unit which has two slots 155 extending horizontally on either side. A recess 157 is provided for the mirror 131 and the light rays 130' and 133' emanating from lamp 126 (FIG. 14) and reflected by mirror 131.

In the lower portion 154 of stereo image carriage 121, a bore 158 is provided below each of the two slots 155. The bores serve to guide the stereo image carriage 121 on two parallel rods 159 (of cylindrical design in the case of the illustrated embodiment). The rods 159 are connected to the end walls 148 and 148' (shown in FIGS. 7 and 6, respectively) and extend in parallel with the optical axis 130 and 133. The housing 120 has an upper covering wall 160 which is provided with a cut-out 161 extending along the optical axis (FIGS. 7 and 9) and adapted for receiving the carriage part which connects the two carriage portions 153 and 154. As shown in FIG. 6, the upper portion 153 extends further towards the end wall 148', i.e. the back end wall according to FIG. 6, of housing 120 than the lower portion 154. The difference is such that the upper portion 153 fully covers the cut-out 161 in the foremost position of the stereo image carriage 121 and that the stereo image carriage 121 can still be shifted to the maximum object distance "g".

Figure 9:
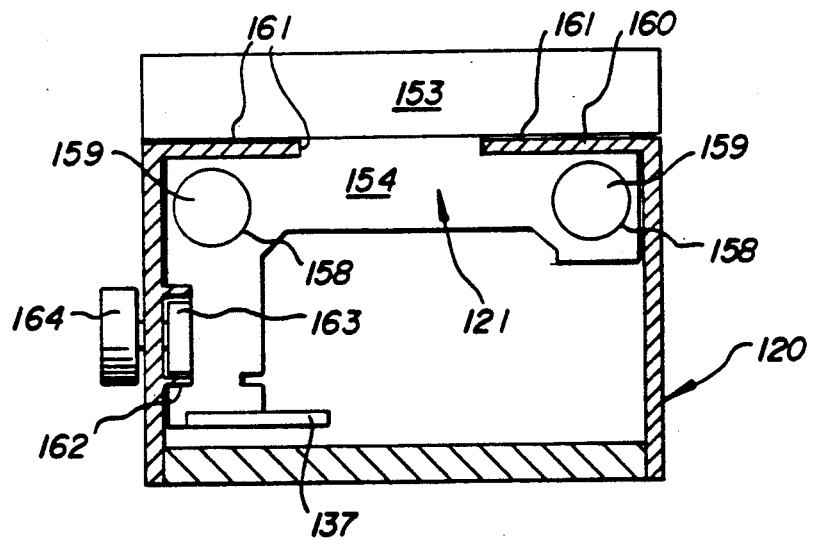
FIG. 9 is a view of the stereo image carriage seen in the direction of arrow VII in FIG. 7, the housing being illustrated in section.

As schematically illustrated in FIG. 9, a rack 162 is provided for moving the stereo image carriage 121 in the axial direction. The rack meshes with a pinion 163 which is operated by a knurled wheel 164 located outside housing 120 such that the stereo image carriage 121 can be held in a self-locking manner by the rack-and-pinion drive and can always be adjusted to the desired object distance. Thus, the desired enlargement or zoom capability is obtained by rotating the knurled wheel 164.

Figure 13:
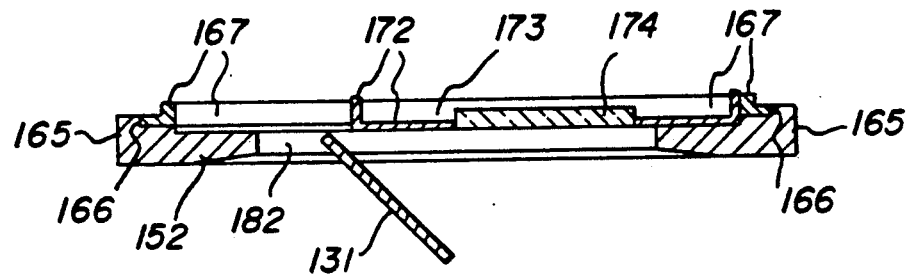
FIG. 13 is a sectional view along lines XI—XI as seen in the direction of arrow XII in FIG. 12.
Figure 14:
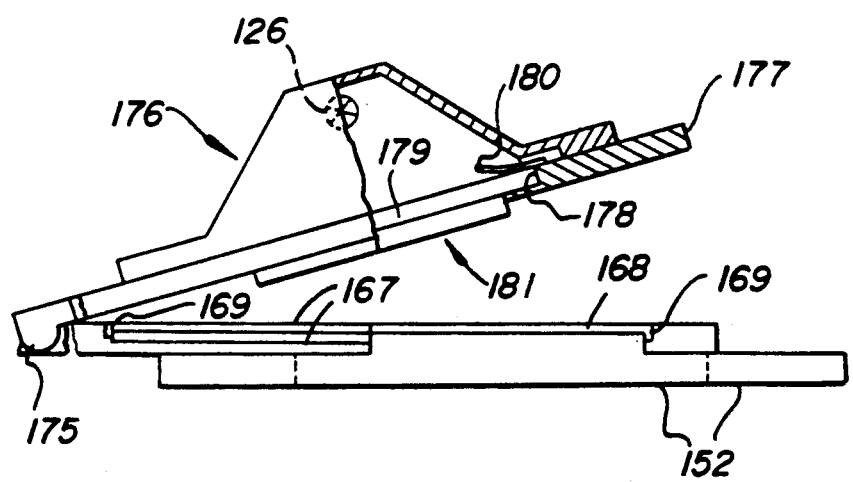
FIG. 14 is a lateral view seen in the direction of the arrow XII in FIG. 12.

The light source unit 125, mounted on stereo image carriage 121 is illustrated in detail in FIGS. 12 to 14. Upright segment-shaped projections 165 have facing surfaces forming straight guide surfaces 166 for two guide rods 170 of a first carriage 167. Abutments 169 on either side, which have projections at the ends of the guide rods 170, limit the motion of the fist carriage 167.

The first carriage 167 includes two parallel guide rails 171 for a second carriage 172. The guide rails 171 are vertically disposed with respect to the guide surfaces 166. The second carriage 172 serves as a holder for the stereo image pair (not illustrated in the drawing). For this purpose, the second carriage 172 includes a glass plate 174 surrounded by a frame of a rectangular shape, as seen from above, for positioning the stereo image pair or the glass plate used for mounting the image pair.

FIG. 14 shows a lid, generally denoted 176, which is pivotally connected with the second carriage 172 by means of a hinge 175. The lid 176 is shown in section on the right side of the figure. The lid 176 includes a bottom plate 177 which is provided with a recess 178 for receiving the flange-type edge 179 of a glass plate 181 which is resiliently held in recess 178 by springs 180 acting on edge 179.

A lamp 126 is arranged in lid 176 above the glass plate 181. The glass plate 181 serves for urging, in cooperation with the glass plate 174, the stereo image pair into a plane position when lid 176 has been pivoted from its raised position as shown in FIG. 14 to its lowered position on the second carriage 172.

As shown in FIG. 12, the second carriage 172 is movable within the first carriage 167 between the two guide rods 170 thereof. The first carriage 167 is in turn movable together with the second carriage orthogonal to the direction of shifting of the latter in the area limited by the abutments 169.

As illustrated in FIGS. 10 and 11, the sensor carriage 123 includes a sheet-metal plate 182 whose edge 183, as shown on the right side in FIGS. 10 and 11, is bent upward and provided with two guide holes 184 which receive the guide rods 159 (see FIG. 7). A third guide hole 185 is provided in that a substantially rectangular strip, shown in dash-dotted lines in FIG. 11, has been cut out of plate 182 and bent upward as can be seen in FIG. 10. The narrow strip 186 of plate 182 adjacent to the cut-out is bent downward and forms a projection 146 adapted for engagement with the second roller follower 145. The imager bracket 151 (FIG. 6) is arranged on the sensor carriage 123 such that the light beams arriving from the stereo image pair and reflected by mirror 131 pass through the lenses mounted in lens bracket 135 and impinge upon surfaces of the two CCD sensors.

For clarity, FIG. 7 only shows the stereo image carriage 121 and the sensor carriage 123. The arrangement of the surfaces of the two CCD sensors and the arrangement of the lens bracket 135 are inferable from FIGS. 4 and 5. In this embodiment, the lens bracket 135 is rigidly attached to the housing 120 in the ray paths between mirror 131, which is movable together with the stereo image carriage 121, and the sensor surfaces which are movable along with the sensor carriage, and are mounted for example on the rods 159.

The stereo image carriage 121 and the sensor carriage 123 are coupled with each other by the same gear mechanism 24 as the stereo image carriage 21 and the sensor carriage 23 shown in the theoretical embodiment of FIGS. 4 and 5.

Figure 8:
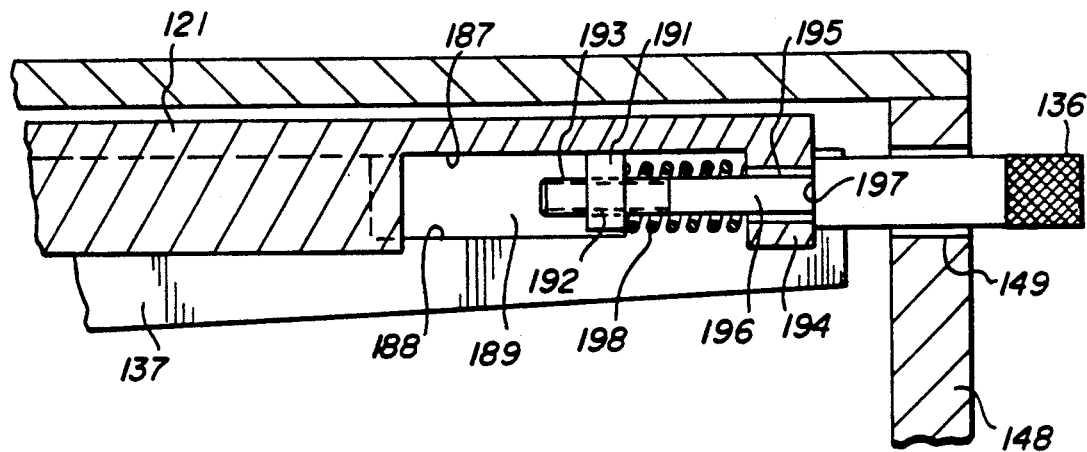
FIG. 8 shows in detail the area designated as VI in FIG. 7.

The connection of the knurled head screw 136 with the cam portion 137 is illustrated in FIG. 8. The cam portion 137 is held in the stereo image carriage 121 so as to be longitudinally shiftable in a dovetail groove. The cam portion 137 includes an opening 188 which is congruent with an opening 187 at the front end of the stereo image carriage 121 adjacent to end wall 148. The material in which the opening 188 is provided is bent upward to form a flange 191 in which a tap hole 192 is located. The tap hole 192 is held in engagement with a thread 193 of the knurled head screw 136.

The end wall 194 of the stereo image carriage 121 includes a bore 195 through which a threaded shaft 196 passes. The threaded shaft 196 terminates, via a shoulder 197, in the grip portion of the knurled head screw 136. The grip portion extends through the recess 149 of housing end wall 148 when the optical system is zoomed to the maximum enlargement. Between flange 191 and end wall 194, a compression spring 198 surrounds the threaded shaft 196, to keep the cam portion 137 in an accurately defined position which results form contact of the shoulder 197 with the end wall 194.

When the knurled head screw 136 is rotated, the cam portion 137 can be shifted in its longitudinal direction thus focusing the optical system of the device via the gear mechanism 24 provided between the stereo image carriage 121 and sensor carriage 123.

As schematically illustrated in FIG. 6, the space between the stereo image carriage 121 and the imager bracket 151 is covered by bellows 198. For the embodiment illustrated in FIGS. 6 to 14, the tension spring 147 (FIG. 7) of the gear mechanism 24 coupling the two carriages 121 and 123 is tensioned between the sensor carriage 123 and the rear end wall 148' of housing 120. Due to a self-locking effect of the rack-and-pinion drive 162, 163 and 164, the sensor carriage 123 is pulled by spring 147 in the direction towards the stereo image carriage.

In operation of the device, the operator grips the stereo image carriage 121 from above with one hand and, using two fingers such as his thumb and index finger, seizes the lid 176. When the stereo image carriage 121 is shifted, the desired enlargement and section of the stereo image pair can be selected. In order to exchange the stereo image pair viewed, the lid 176 need only be pivoted upward about hinge 175.

In the two embodiments illustrated, the lens bracket is rigidly attached to the housing 20 and 120. In order that various enlargements can be set, the stereo image carriage 21 and 121 and the sensor carriage 23 and 123 are adjustable relative to each other such that the desired section of the stereo image pair is focused on the CCD sensors' surface.

Figure 15:
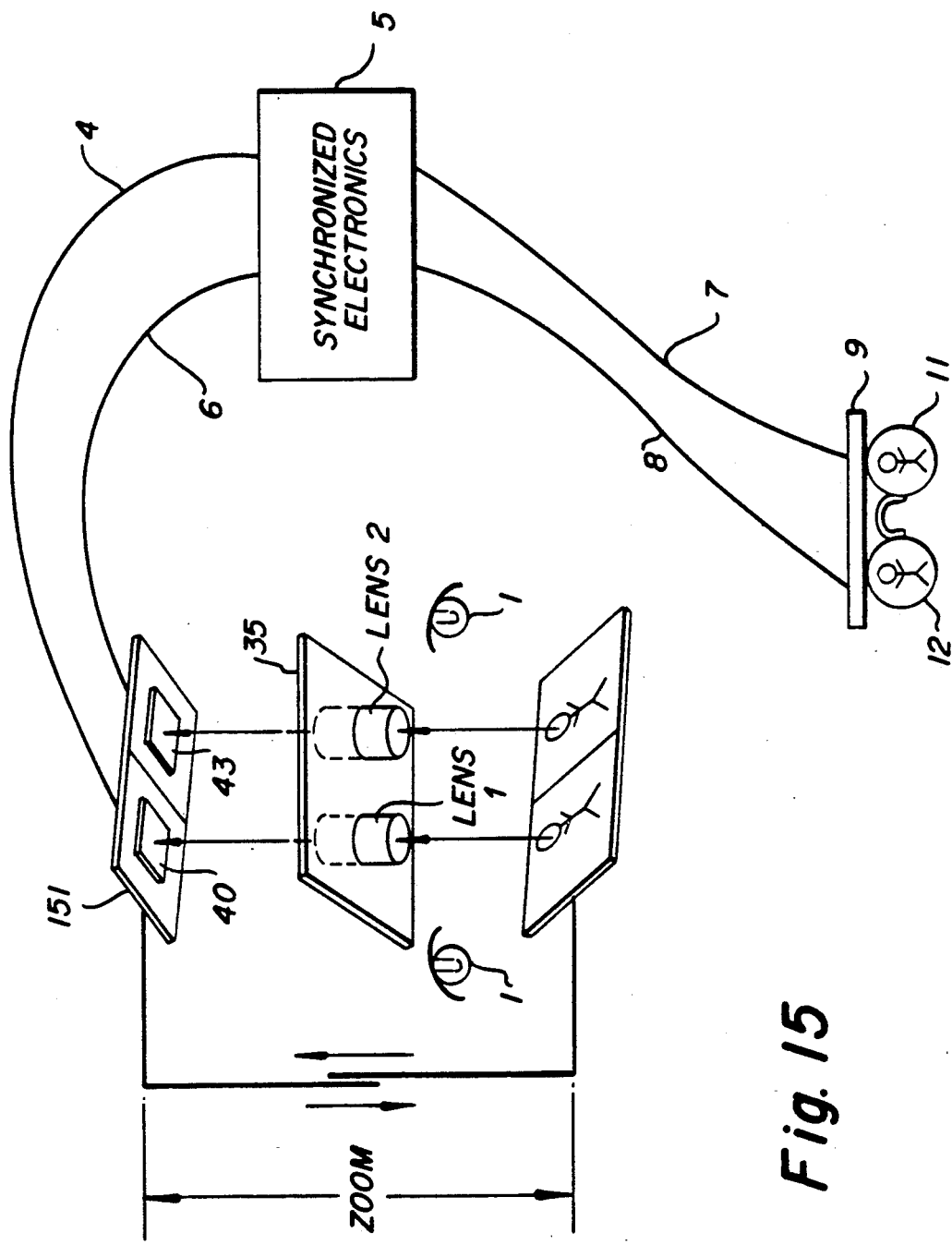
FIG. 15 is a simplified schematic block diagram of an embodiment of the present invention using stereoscopic prints.

If a nontransparent image such as a stereo print, rather than a stereoscopic slide, is illuminated, the images can be reproduced in a similar manner on the two CCD sensors using the arrangement schematically shown in FIG. 15.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A system for viewing a stereo image from a stereo image pair in a fixed medium having first and second images, comprising:

first and second image sensors, each sensor associated with one of the first and second images and scanning a desired section of its associated image, the first and second image sensors producing first and second image bearing signals, respectively;

means for optically imaging the desired section of the first and second images on their associated image sensors, the means for optically imaging defining first and second optical axes; said lens unit having first and second lenses, each lens having an identical constant focal length for focusing a respective one of said first and second images onto said first and second image sensor;

an enlarging means for enlarging the desired section of the first and second images which is optically imaged onto said image sensors which varies the distance between said stereo image pair and said lens unit;

a panning device for panning the desired section of the first and second images which is optically imaged onto said image sensors; and a synchronizing circuit for synchronizing the first and second image bearing signals to produce the stereo image.

2. A system according to claim 1, wherein the enlarging means comprises a first carriage holding the first and second image sensors;

a second carriage coupled with the stereo image pair;

a third carriage for holding the lens unit wherein two of the three carriages are adjustable relative to each other for enlarging the stereo image such that the lens unit images the desired section of &:he stereo image pair with high resolution onto said first and second image sensors.

3. A system according to claim 1, wherein the panning device for panning the stereo image comprises a holder for the stereo image pair coupled with said second carriage, the holder being adjustable in the plane of the stereo image pair relative to the second carrier to allow the stereo image pair to be panned.

4. A system according to claim 2, wherein the means for optically imaging further comprises a mirror fixedly mounted in the second carriage, the first and second optical axes of the lens unit being deflected by the mirror to form segments of the first and second optical axes wherein the plane of the stereo image pair is arranged in a desired manner vertical to the planes defined by the deflected segments and the first and second optical axes.

5. A system according to claim 1, wherein the synchronizing circuit comprises first and second processors associated with the first and second image sensors for processing the image bearing signals; and a timing generator coupled to the first and second processors.

6. A system according to claim 5, wherein the first and second image sensors are CCD sensors.

7. A system according to claim 1, wherein the fixed medium for the stereo image pair is a stereo slide.

8. A system according to claim 1, wherein the fixed medium for the stereo image pair is a stereo print.

9. A method for operating a viewer to manipulate a stereo image formed from a fixed stereo image pair having first and second images, the method comprising the steps of:

placing the fixed stereo image pair in a holder coupled with a first carriage;

optically imaging with an optical assembly located on a second carriage a desired section of the first and second images on the first and second image sensors, respectively;

coordinately scanning the desired sections of the first and second images with the first and second image sensors, respectively, located on a third carriage;

adjusting two of the three carriages relative to each other for enlarging the first and second images formed on the first and second image sensors;

providing first and second image bearing signals from the first and second image sensors as a result of the scanning step; and synchronizing the first and second image bearing signals to provide a stereo signal for viewing.

10. A method for operating a viewer to manipulate a stereo image formed from a fixed stereo image pair having first and second images, the method comprising the steps of:

placing the fixed stereo image pair in a holder coupled with a first carriage;

optically imaging with an optical assembly located on a second carriage a desired section of the first and second images on the first and second image sensors, respectively;

coordinately scanning the desired sections of the first and second images with the first and second image sensors, respectively, located on a third carriage;

adjusting the holder in the plane of the fixed stereo image pair relative to the first carriage to pan the first and second images formed on the first and second image sensors;

providing first and second image bearing signals from the first and second image sensors as a result of the scanning step; and synchronizing the first and second image bearing signals to provide a stereo signal for viewing.

11. A method for operating a viewer to manipulate a stereo image formed from a fixed stereo image pair having first and second images, the method comprising the steps of:

placing the fixed stereo image pair in a holder coupled with a first carriage;

optically imaging with an optical assembly located on a second carriage a desired section of the first and second images on the first and second image sensors, respectively;

coordinately scanning the desired sections of the first and second images with the first and second image sensors, respectively, located on a third carriage;

adjusting two of the three carriages relative to each other for enlarging the first and second images formed on the first and second image sensors;

adjusting the holder in the plane of the fixed stereo image pair relative to the first carriage to pan the first and second images formed on the first and second image sensors;

providing first and second image bearing signals from the first and second image sensors as a result of the scanning step; and synchronizing the first and second image bearing signals to provide a stereo signal for viewing.

* * * * *